July 30, 1946.    R. S. BASSETT    2,404,823
ACCURACY REGULATING MEANS FOR FLUID METERS
Filed Aug. 2, 1944

INVENTOR
Robert S. Bassett,
BY
Parker, Prochnow & Farmer,
ATTORNEYS

Patented July 30, 1946

2,404,823

UNITED STATES PATENT OFFICE 2,404,823

ACCURACY REGULATING MEANS FOR FLUID METERS

Robert S. Bassett, Buffalo, N. Y.

Application August 2, 1944, Serial No. 547,771

14 Claims. (Cl. 73—233)

This invention relates to means for increasing the accuracy of fluid meters of the type having a register which indicates the amounts of fluid that pass through the meter for measurement.

In meters of this type, the measuring mechanism is usually connected with the registering mechanism by means of a train of gears and the accuracy of registration of such a meter may be improved by removing a gear of the train and substituting a gear having more or less teeth, as may be required to obtain the desired gear ratio, and also by placing between the measuring and registering mechanisms of variable ratio rotary movement transmission unit to be used as an accuracy regulating mechanism. Such regulating mechanisms as heretofore known have the disadvantage that they do not render the meters accurate on measurements of small quantities of liquid.

One of the objects of this invention is to provide in a fluid meter an improved accuracy regulating mechanism whereby a high accuracy is achieved in measuring small quantities of liquids, such as are often used in industrial processing operations. It is also an object to provide a regulating mechanism of this type which makes the necessary correction in proportion to the revolutions of the register shaft of the meter rather than the stuffing box shaft. Another object is to provide a mechanism of this type by means of which frequent corrections of the registering mechanism can be made at a number of intervals during each revolution of the register shaft so that the meter will read more accurately for quantities indicated by fractions of the revolution of the register shaft. Another object is to provide a mechanism of this type which can readily be adjusted from the exterior of the meter. A further object is to provide a mechanism of this kind by means of which a meter can be readily adjusted to register accurately on different liquids of different viscosities. It is also an object of this invention to provide a mechanism of this kind by means of which either plus or minus corrections can be made, i. e., either to provide an increased or decreased movement of the registering mechanism and its shaft relatively to the measuring mechanism. Other objects and advantages of this invention will appear from the following description and claims.

Figure 1:
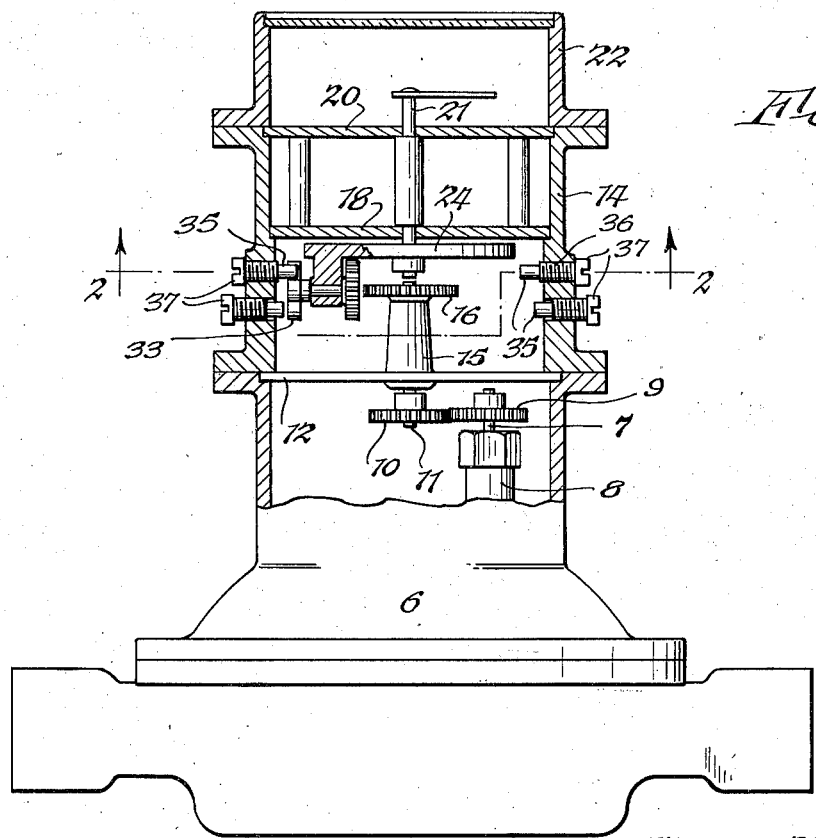
Fig. 1 is an elevation of a meter, partly in section, to show an accuracy improving device embodying this invention.
Figure 3:
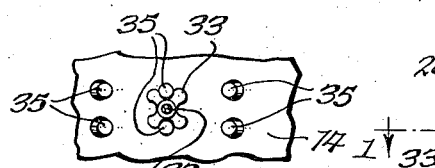
Fig. 3 is a fragmentary elevation, partly in section, on line 3—3, Fig. 2.

My improvements may be applied to a meter of any desired type, that shown by way of example in the drawing including a housing 6 which contains a measuring unit of any suitable or desired type. This measuring unit imparts rotary motion to a stuffing box shaft 7 extending through a stuffing box 8. This shaft has a gear 9 mounted thereon which meshes with a gear 10 mounted on a shaft 11 which extends through a wall or partition plate 12 into an upper casing or housing 14. The shaft 11 extends through a sleeve 15 of the partition plate 12 and has a worm gear 16 secured to the upper end thereof. This partition may be secured in place between the housing parts 6 and 14, which are secured together in the usual manner by means of bolts (not shown) extending through adjacent flanges of the two housing parts. By means of this arrangement, it is also easy to change the gear 10 for another gear having a larger or smaller number of teeth, since it is merely necessary to separate the housing parts to obtain access to the gear 10.

The upper part of the housing 14 contains a pair of transverse plates or partitions 18 and 20 on which a register shaft 21 is pivoted. The details of the registering and indicating mechanism is not shown and may be of any suitable construction. The upper end of the register shaft extends into the register box 22 and the lower end has a transmission carrier, which may be in the form of a disk or plate 24 secured thereon below the partition plate 18. This shaft is so mounted as to be coaxial with the shaft 11.

Figure 2:
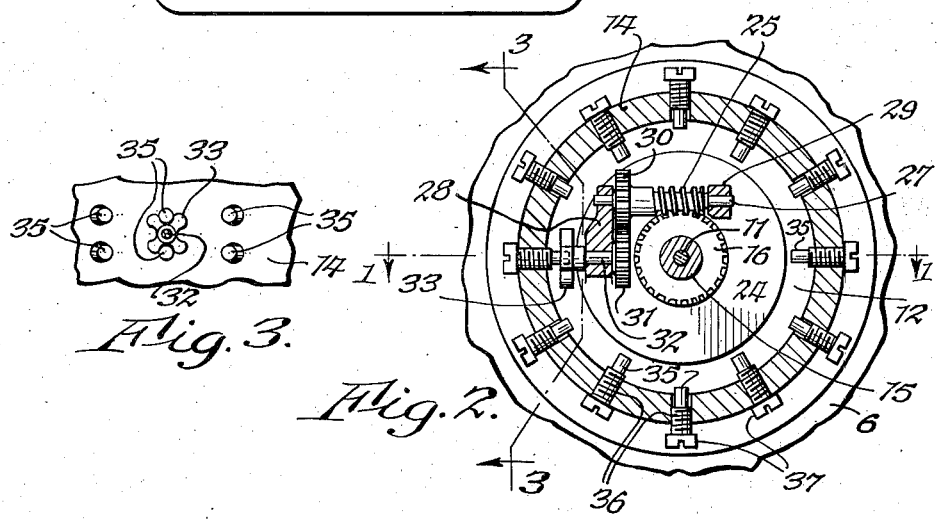
Fig. 2 is a sectional plan view thereof, on line 2—2, Fig. 1.

Secondary drive gearing is mounted on the disk 24 for transmitting rotation of the shaft 11 to the register shaft 21, and this secondary gearing may be actuated to vary the ratio of rotation of the shafts 11 and 21 to produce a greater accuracy of registration for the meter than can be produced by merely changing the gear 10 for one having more or less teeth. This secondary drive gearing may be of any suitable or desired construction, that shown by way of example including a worm 25 secured to a shaft 27, Fig. 2, the shaft 27 being journalled on bearing brackets 28 and 29 depending from the disk 24. These bearing brackets may be formed integral with the disk and are so arranged that the worm 25 meshes with the worm gear 16 secured to the upper end of the shaft 11.

The worm shaft 27 has a gear 30 mounted thereon which meshes with a gear 31 secured on one end of a shaft 32 also journalled in the bearing bracket 28. The other end of this shaft has a spur wheel 33 secured thereto which may be turned when any of the teeth of this wheel is engaged by a pin or other part relatively to which this wheel moves.

In the operation of the mechanism thus far described, when the spur wheel 33 is not turned, it will be obvious that the shafts 11 and 21 are coupled together by means of the secondary gearing so that any rotary motion of the shaft 11 produces a corresponding rotary motion of the shaft 21, since the pitch of the worm 25 is such that the worm cannot be turned by the worm gear 16. If, however, the worm 25 is turned, one of the shafts 11 and 21 may be turned relatively to the other. Consequently, if the spur wheel 33 is rotated in one direction, the worm 25 will cause one of these shafts to turn in one direction relatively to the other shaft, and if the spur wheel 33 is rotated in the opposite direction, these shafts will be turned in the opposite direction relatively to each other. The gears 30 and 31 merely serve to transmit rotation of the spur wheel 33 to the worm 25, and any other means may be employed for accomplishing this purpose.

The turning of the spur wheel may be accomplished in any desired manner and in the construction shown, the spur wheel shaft is mounted substantially radially on the disk 24, so that during the operation of the meter, the spur wheel travels in a circle about the axis of the shafts 11 and 21 near the annular wall of the housing 14. The turning of the spur wheel is, consequently, effected in the construction shown by one or more pins projecting inwardly from this wall. I have shown by way of example a plurality of pins 35, each formed on the end of a screw 36 extending through a threaded hole in the wall of the housing 14. The outer ends of the screws have heads 37 on the exterior of the wall by means of which the screws may be turned, so that the screws may be moved inwardly so that the pins extend into the path of movement of the spur wheel 33, or the screws may be moved outwardly so that the pins are beyond the path of movement of the wheel 33. The screws are also arranged in two zones, one arranged so that the pins thereof engage the spur wheel above its axis of rotation to turn the spur wheel in one direction, and the other zone arranged so that the pins thereof may extend inwardly to engage the spur wheel below its axis of rotation to turn the spur wheel in the opposite direction.

Any desired number of screws may be provided in each zone. To obtain a high degree of accuracy, a large number of screws should be provided in each zone and the pitch of the worm 25 should be as small as possible with a correspondingly large number of teeth in the worm gear 16.

In the operation of the mechanism described, if it is found that the meter with all the pins withdrawn has the desired degree of accuracy, the pins are all left in their withdrawn positions. If the meter records less than the actual amount of fluid passing through the measuring chamber, one or more pins of one zone are moved inwardly by turning the screws. When the correct number of pins have been moved inwardly, the meter will read accurately. When the meter records more than the actual amount of fluid passing through the measuring chamber, the pins of the other zone are moved inwardly until the desired correction has been made. If the error in reading is relatively large, the change gear 10 may be removed and replaced by a gear having a different number of teeth, whereupon further accuracy may be obtained by means of the pins. By means of changing gears, a coarse adjustment of the registering mechanism relatively to the measuring mechanism can be effected, and the fine adjustment is then effected by means of the pins. The intermediate gearing may, for example, be so proportioned that each pin actuating this gearing is equivalent to a fraction of the correction obtained by one-tooth change in the change gear 10, or this gearing may be proportioned to make a greater change in the ratio of movement of the shaft 21 relatively to the shaft 11, thus avoiding the necessity of changing gears.

One of the advantages of the construction shown is that by mounting the accuracy regulating gearing on the register shaft 21, a complete cycle of corrections will be made by means of this gearing for each revolution of this shaft 21. This contrasts with meters heretofore constructed in which the gearing was mounted on the measuring shaft in that in prior meters the complete cycle of corrections was made once during each revolution of the measuring shaft, so that at intervals the register shaft might move through a complete revolution without any correction being made, especially when there would be only one movement of the worm per cycle. For example, if in such prior meters one rotation of the register shaft represents 10 gallons and the measuring shaft rotates on the average of one for every 15 gallons that pass through the meter, then such meter would at intervals register more than 10 gallons for one rotation of the register shaft, and for other rotations would register slightly less than 10 gallons, in order that the meter be correct for large quantities. By having the accuracy regulating gearing on the register shaft as in the construction herein shown, it will be obvious that this gearing must be actuated during each and every revolution of the register shaft, so that the meter will always read correctly for any revolution of the register shaft because there has been a complete cycle of correction. For example, if each revolution of the register shaft represents 10 gallons, my improved meter will correctly indicate 10 gallons for each revolution of the register shaft, since in my improved meter, the accuracy regulating gearing moves in direct ratio to the revolutions of the register shaft, while in prior meters accuracy could be expected only on quantities of 100 gallons or more.

Since meters of this type are often employed by their users for different kinds of liquids with differing viscosities, for example, for measuring gasoline and then for measuring oil, the meter must be corrected when changed from one liquid to another, and since such users usually have generally only 10 gallon or 20 gallon containers for use in correcting the meters, it is very important that the meter measures such small quantities accurately, since otherwise it cannot readily be correctly adjusted for larger quantities.

The meter described has the further advantages that corrections may be easily made in the meter from the exterior of the housing, and such corrections may be either for adding to the meter reading or for reducing the reading. The mechanism is simple and efficient in operation and includes no parts which are subject to rapid wear or deterioration.

My improved mechanism may be made to operate more accurately on small quantities by having the pins 35 which are in operative positions arranged substantially uniformly about the circumference of the path of movement of the spur wheel. For example, if only two pins are used, they should be substantially diametrically opposite each other. In this manner, the secondary gearing will be actuated at substantially regular intervals, so that the registering mechanism will be corrected frequently, thus reducing errors in the same. The mechanism described also has the advantage that any necessary correction either plus or minus, can be readily made without taking the meter apart, by means of the pins 35, and additional corrections can be made by changing the gear 10, which is readily accessible by removing the housing 14 from the lower housing 6. Other means for effecting the actuation of the adjusting mechanism may, however, be used, to provide a complete cycle of correction, for each revolution of the driven portion of the regulating mechanism.

It is not intended to limit this invention to the particular adjusting mechanism shown, nor to the particular manner of mounting the same on the registering mechanism.

I claim as my invention:

1. An accuracy regulator for a liquid meter having a measuring mechanism and a registering mechanism including a driving shaft therefor, said regulator including gearing connected with said measuring mechanism and a transmission carrier for said gearing and secured to said shaft, and stationary means on said meter for actuating said gearing to produce relative movement of said registering mechanism relatively to said measuring mechanism with a complete cycle of said relative movement for each revolution of said shaft.

2. In an accuracy regulator for a meter having a measuring mechanism shaft and a registering mechanism, means connecting said shaft and said registering mechanism and including a transmission carrier rigidly connected to said registering mechanism to rotate in unison therewith, transmission gearing mounted on said carrier and operatively connected with said measuring mechanism shaft to drive said registering mechanism, and means actuated by the rotation of said carrier to operate said gearing to produce relative movement of said carrier and said gearing, to move said registering mechanism relatively to said measuring mechanism shaft.

3. In an accuracy regulator for a meter having a measuring mechanism shaft and a registering mechanism, means connecting said shaft and said registering mechanism and including a transmission carrier rigidly mounted on said registering mechanism to rotate in unison therewith, transmission gearing mounted on said carrier and operatively connected with said measuring mechanism shaft to drive said registering mechanism from said shaft when said gearing is rotated bodily with said shaft, said gearing including a spur wheel, and stationary means on said meter for engaging the teeth of one portion of said spur gear to turn the same in one direction to actuate said gearing to advance said registering mechanism relatively to said shaft, and to engage the teeth of the opposite portion of said spur gear to turn the same in the opposite direction to retard said registering mechanism relatively to said shaft.

4. In an accuracy regulator for a meter having a measuring mechanism shaft and a registering mechanism and transmission gearing rotatable bodily to transmit rotation of said shaft to said registering mechanism and adapted to be actuated to produce relative motion of said registering mechanism and said shaft, that improvement which comprises a spur wheel connected to actuate said gearing and extending outwardly from said gearing to move in a circular path when said gearing is rotated bodily, and a stationary member on said meter arranged to be moved into and out of position to extend into the path of movement of a single tooth of said spur wheel to turn said spur wheel to actuate said gearing to produce movement of said registering mechanism relatively to said shaft.

5. An accuracy regulator according to claim 4, characterized in that a plurality of stationary members are provided which may be moved into and out of said circular path of movement of said spur wheel to vary the extent of correction of said meter.

6. An accuracy meter according to claim 4 characterized in that a plurality of stationary members are provided and arranged at opposite sides of said path of movement and movable into and out of positions to engage said spur wheel to turn the same in either direction of its rotation to advance or retard said registering mechanism relatively to said shaft.

7. An accuracy meter according to claim 4 characterized in that a plurality of stationary members are provided at different points along said circular path and movable into and out of position to engage said spur wheel to move it about its axis to actuate said gearing to move said registering mechanism relatively to said shaft.

8. An accuracy regulator for a meter having a measuring mechanism shaft and a registering mechanism shaft, a transmission carrier mounted on one of said shafts, and a worm gear secured to the other shaft, a worm meshing with said worm gear and rotatably mounted on said carrier, a spur wheel operatively connected to drive said worm and moving bodily in a circular path, and a plurality of means on said meter, each operable from the exterior of said meter to engage only individual spurs of said spur wheel to turn the same when said transmission carrier rotates, to change the relative positions of said carrier and said worm gear.

9. An accuracy regulator for a meter having a housing, a measuring mechanism shaft and a registering mechanism shaft, a transmission carrier arranged in said housing and mounted on one of said shafts and a worm gear secured to the other shaft, a worm meshing with said worm gear and rotatably mounted on said carrier, a spur wheel operatively connected to drive said worm and moving bodily in a circular path adjacent to the inner surface of said housing, and a plurality of means on said housing, each movable into and out of the path of movement of the spurs of said spur wheel from the exterior of said housing into and out of position to engage one spur of said spur gear to turn the same to change the relative positions of said carrier and said worm gear.

10. An accuracy regulator according to claim 9, in which said means are in the form of pins projecting through said housing and movable prothe exterior of said housing into and out of said path of movement.

11. An accuracy regulator according to claim 9, in which said means are in the form of pins projecting through said housing and movable from the exterior of said housing into and out of said path of movement and arranged in two series, the pins of one series retarding said registering mechanism relatively to said measuring mechanism, and the pins of the other series advancing said registering mechanism relatively to said measuring mechanism.

12. An accuracy regulator for a liquid meter having a measuring mechanism and a registering mechanism including a driving shaft therefor, said regulator including gearing connected with said measuring mechanism and a transmission carrier for said gearing and secured to said shaft, means for turning said gearing in one direction to retard said registering mechanism relatively to said measuring mechanism and in the opposite direction to advance said registering mechanism relatively to said measuring mechanism, and actuating devices on said meter movable into and out of positions to actuate said means for turning said gearing to produce movement of said registering mechanism relatively to said measuring mechanism.

13. An accuracy regulator for a liquid meter having a measuring mechanism and a registering mechanism, said regulator including gearing connected with said measuring mechanism and said registering mechanism, a transmission carrier for said gearing, means for turning said gearing in one direction to retard said registering mechanism relatively to said measuring mechanism and in the opposite direction to advance said registering mechanism relatively to said measuring mechanism, and actuating devices stationarily mounted on said meter and movable into and out of positions to actuate said gearing, said actuating devices being arranged in two zones, the actuating devices of one zone being arranged to actuate said gearing in a direction to advance said register mechanism relatively to said measuring mechanism and the actuating devices of the other zone being arranged to actuate said gearing in a direction to retard said registering mechanism relatively to said measuring mechanism.

14. In an accuracy regulator for a meter having a measuring mechanism shaft and a registering mechanism, means connecting said shaft and said registering mechanism and including a transmission carrier connected to said registering mechanism to rotate therewith, transmission gearing mounted on said carrier and operatively connected with said measuring mechanism shaft to drive said registering mechanism from said shaft when said gearing is rotated bodily with said shaft, said gearing including a spur wheel, and a plurality of stationary members on said meter each located in position for engaging one tooth of said spur wheel during each rotation of said transmission gearing with said registering mechanism to turn the spur wheel through a part of a revolution corresponding to one tooth distance to actuate said gearing to produce relative movement of said registering mechanism relatively to said shaft.

ROBERT S. BASSETT.